United States Patent
Csoltova et al.

(10) Patent No.: US 12,514,234 B2
(45) Date of Patent: Jan. 6, 2026

(54) METHOD AND SYSTEMS FOR EVALUATING PET FOOD

(71) Applicant: Mars, Incorporated, McLean, VA (US)

(72) Inventors: Erika Csoltova, London (GB); Tammie King, Melton Mowbray (GB); Hannah Elizabeth Flint, Oakham (GB); Alysia Brioni Grace Hunt, Leicester (GB)

(73) Assignee: Mars, Incorporated, McLean, VA (US)

( * ) Notice: Subject to any disclaimer, the term of this patent is extended or adjusted under 35 U.S.C. 154(b) by 662 days.

(21) Appl. No.: 17/637,211

(22) PCT Filed: Aug. 24, 2020

(86) PCT No.: PCT/US2020/047630
§ 371 (c)(1),
(2) Date: Feb. 22, 2022

(87) PCT Pub. No.: WO2021/041311
PCT Pub. Date: Mar. 4, 2021

(65) Prior Publication Data
US 2022/0295751 A1    Sep. 22, 2022

Related U.S. Application Data

(60) Provisional application No. 62/890,714, filed on Aug. 23, 2019, provisional application No. 62/890,754, filed on Aug. 23, 2019.

(51) Int. Cl.
*A23K 50/40* (2016.01)
*A01K 29/00* (2006.01)
(Continued)

(52) U.S. Cl.
CPC .......... *A01K 29/005* (2013.01); *G01J 5/0025* (2013.01); *G01K 13/223* (2021.01); *G01J 2005/0077* (2013.01)

(58) Field of Classification Search
CPC ................. A01K 29/005; G01J 5/0025; G01J 2005/0077; G01K 13/223; G01K 13/20; G06V 40/10; A23K 50/40
See application file for complete search history.

(56) References Cited

U.S. PATENT DOCUMENTS 10,091,972 B1    10/2018    Jensen et al.
2005/0002863 A1*   1/2005    Araujo ............... A61K 49/0004
                                                        424/9.2
(Continued)

FOREIGN PATENT DOCUMENTS

CN          109691405          4/2019

OTHER PUBLICATIONS

Callon et al. "Canine Food Preference Assessment of Animal and Vegetable Ingredient-Based Diets Using Single-Pan Tests and Behavioral Observation", Oct. 2017 (Year: 2017).*
(Continued)

*Primary Examiner* — Eyob Hagos
(74) *Attorney, Agent, or Firm* — Bookoff McAndrews, PLLC

(57) ABSTRACT

A method for evaluating a companion pet food is provided. The method comprises providing at least a first and a second pet food to a companion animal, taking one or more non-contact thermal measurements of the companion animal while interacting with the first and second pet foods, and comparing the measurements. Kits, systems and/or computer media for carrying out the method form further aspects of the invention.

22 Claims, 5 Drawing Sheets

(51) Int. Cl.
*G01J 5/00* (2022.01)
*G01K 13/20* (2021.01)

(56) References Cited

U.S. PATENT DOCUMENTS

| | | | | |
|---|---|---|---|---|
| 2008/0252464 | A1* | 10/2008 | Panasevich | G07C 9/28 340/573.1 |
| 2010/0299074 | A1* | 11/2010 | Chang | A01K 29/00 702/19 |
| 2010/0332140 | A1* | 12/2010 | Joyce | A23K 50/40 119/51.01 |
| 2015/0342143 | A1 | 12/2015 | Stewart | |
| 2016/0012748 | A1* | 1/2016 | Donavon | G09B 19/0092 434/225 |
| 2016/0192620 | A1* | 7/2016 | Hu | A61B 5/01 119/51.02 |
| 2016/0212971 | A1* | 7/2016 | Hill | A01K 5/0114 |
| 2017/0181450 | A1* | 6/2017 | Franks | A23K 50/48 |
| 2017/0196196 | A1* | 7/2017 | Trottier | A01K 15/027 |
| 2018/0213821 | A1* | 8/2018 | Rogues | A23K 20/10 |
| 2020/0118173 | A1* | 4/2020 | Chu | G06F 16/27 |

OTHER PUBLICATIONS

Travain et al. "How good is this food? A study on dogs' emotional responses to a potentially pleasant event using infrared thermography" Mar. 2016 (Year: 2016).*
International Search Report and Written Opinion issued in PCT/US2020/047630 on Nov. 5, 2020.
A. L. Schaefer et al: "The non-invasive and automated detection of bovine respiratory disease onset in receiver calves using infrared thermography", Research in Veterinary Science, vol. 93, No. 2, Oct. 1, 2012 (Oct. 1, 2012), pp. 928-935, XP55742360, GB ISSN: 0034-5288, DOI: 10.1016/j.rvsc.2011.09.021 figures 1-2.
Meghan C. Callon et al: "Canine Food Preference Assessment of Animal and Vegetable Ingredient-Based Diets Using Single-Pan Tests and Behavioral Observation", Frontiers in Veterinary Science, vol. 4, Oct. 3, 2017 (Oct. 3, 2017), XP55742634, DOI: 10.3389/fvets.2017.00154 the whole document.
Travain Tiziano et al: "How good is this food? A study on dogs' emotional responses to a potentially pleasant event using infrared thermography", Physiology and Behavior, Elsevier Science Ltd., Oxford, GB, vol. 159, Mar. 17, 2016 (Mar. 17, 2016), pp. 80-87, XP029493408, ISSN: 0031-9384, DOI: 10.1016/J.PHYSBEH.2016.03.019 the whole document.

* cited by examiner

METHOD AND SYSTEMS FOR EVALUATING PET FOOD

CROSS-REFERENCE TO RELATED APPLICATION(S)

This application is the U.S. National Phase Entry under 35 U.S.C. § 371 of International Application No. PCT/US2020/047630, filed on Aug. 24, 2020. The International Application No. PCT/US2020/047630 claims priority to U.S. Provisional Application No. 62/890,714, filed on Aug. 23, 2019, and U.S. Provisional Application No. 62/890,754, filed on Aug. 23, 2019, which are incorporated by reference herein in their entirety.

FIELD

The present disclosure relates to methods of evaluating pet food. Systems, kits and computer media for carrying out such methods are also provided.

BACKGROUND

Companion animal caregivers are tasked with providing a diet for their pets that meets their nutritional needs. Above and beyond meeting nutritional needs, however, many caregivers prefer to provide their animals with a diet that the animal enjoys. Indeed, many caregivers derive a large portion of the satisfaction of pet ownership from providing their pets with food that the pet appears excited to receive and consume. However, not all pets are demonstrative in ways readily understood by their caregivers. Similarly, pet food manufacturers are of course interested in developing and producing foods enjoyed by pets, as such foods would be expected to enjoy greater commercial success than foods that are nutritionally complete, but not favoured by animals.

Travain et al. (2016), Physiology & Behavior, 159, 80-87 investigated the emotional response of dogs to a pleasant event using infrared thermography. In the study, infrared images were taken of dogs in anticipation of receiving a treat from their owner, and while consuming a treat hand fed by their owner. Behavioural measurements were also taken. After noting that the surface body temperature can increase or decrease depending on the species of animal, the anatomical area measured and the type of stimulus used, the investigators concluded that infrared measurements alone, though useful, provide an insufficient/incomplete indicator of a dog's emotional state.

Both pet food manufacturers and pet caregivers would benefit from a method of evaluating a pet food that was straightforward to use, and provided consistent results. Such a method would be further beneficial if it provided reliable results based on objective criteria, and even more so, if a single objective criteria were the basis of the evaluation. Further benefits would be a method that did not require the consumption of large amounts of pet food in order to assign a preference, as would be the case where food preference is based on the relative amounts of food eaten when an animal is given a choice.

SUMMARY

In some aspects, the methods described herein provide reliable and objective results of the preference of an animal for one food as compared to another, based upon measurement of only one parameter. Said parameter can be measured one time or multiple times. The method is thus readily implemented by a pet owner in the selection of a diet preferred by their pet, which in turn, can lead to increased pet ownership satisfaction and an enhanced human-animal bond.

In some aspects, a method is provided for evaluating a pet food, and may advantageously be applied to at least two pet foods (that may in some embodiments, be nutritionally complete and balanced) to determine animal preference. In some embodiments, the method includes providing at least a first and second pet food to a companion animal, such as a cat or a dog. The first and second pet foods may be provided to the dog or cat by placing an appropriate amount of food in a pet food receptacle, such as a dish or automatic dispenser operatively disposed relative to a thermal measurement device. The thermal measurement device may be a contact or a noncontact thermal measurement device. In some embodiments, the first and second foods are provided separately, but under similar circumstances, i.e., at the same time of day but on different days, or on the same day, but at different mealtimes.

The pet food receptacle may be configured to accept input from the thermal measurement device, and/or to display indicia indicative of the input.

One or more thermal measurements of the animal are taken during a first food interaction, that is, one or more thermal measurements are taken while the animal is interacting with the first pet food such as by smelling or feeding, and/or after feeding of the first pet food. One or more thermal measurements of the animal are taken during a second food interaction, that is, one or more thermal measurements are taken when the animal is interacting with the second pet food such as by smelling or feeding, and/or after feeding of the second pet food. For completeness, thermal measurements may also be taken pre-interaction, that is, before any food is brought into the presence (e.g. room) of the animal. For example, the thermal measurements may be taken when the animal is engaging in pre- or post-feeding behavior, or, during feeding.

The thermal measurements taken during the first food interaction are compared with the thermal measurements taken during the second food interaction. In some embodiments, an increase in the animal's temperature between the first food interaction and the second food interaction indicates food enjoyment/preference. In other embodiments, a decrease in the animal's temperature between the first food interaction and the second food interaction indicates an increase in food enjoyment/preference. Whether an increase in temperature or a decrease in temperature indicates a food enjoyment/preference by the animal is dependent on what body part of the animal the thermal measurements are collected from.

In some aspects, a noncontact thermal measurement is taken. In some embodiments, the noncontact thermal measurement is taken from a part of the companion animal not covered with fur/hair, for example, the noncontact thermal measurement may be taken from either or both eye(s), either or both ear(s), nose tip, or a combination of these.

The noncontact thermal measurement may be taken with a noncontact thermometer, a thermal imaging device, or both of these. In those instances wherein the noncontact thermal measurement is taken with a thermal imaging device, further advantages in, e.g., resolution, may be seen via the use of a radiometric thermal imaging device.

The method is readily implemented by a pet owner and can be used by the pet owner to select a food to provide to their animal (based upon the results of the method as to which of two foods the animal prefers), or to provide an indication of the animal's enjoyment of the food the animal is provided. In some aspects, a system useful for conducting the method is also provided. The system includes a thermal measurement device operatively disposed relative to a pet food receptacle, such as a food dish or an automatic dispenser. Whatever the particular receptacle, it may advantageously be configured to accept input from the noncontact thermal measurement device, and/or to provide indicia, such as by a graphical user interface, or an alphanumeric or light display, based upon the input. In some embodiments, the thermal measuring device is a noncontact thermal measuring device. In other embodiments, the thermal measuring device is a contact thermal measuring device.

In some embodiments, the noncontact thermal measurement device can be a thermal imaging device, a noncontact thermometer, or may be device that incorporates both. In those instances that a thermal imaging device is used, additional advantages can be seen via use of a radiometric thermal imaging device.

In some embodiments, the contact thermal measurement device can be a non-invasive, surface contact thermometer, which may further be provided in connection with a device that may be affixed to or abuts the animal so that the non-invasive surface contact thermometer is able to measure the temperature of the desired portion of the animal. The surface contact thermometer may be provided in conjunction with, e.g., a shirt, booties or a collar. Or, the surface contact thermometer may be provided in connection with a placemat.

The system may further include a processor and memory storing the code of an algorithm. When the code is executed by the processor, the system receives the inputs from the thermal measurement device, e.g., a noncontact or a contact thermal measurement device, compares them, and generates an output for display on or near the system. The output may include indicia and/or a customized recommendation for the ongoing dietary regimen of the companion animal.

In some aspects, the present disclosure includes a kit including at least two different pet foods, a thermal measurement device, e.g., a contact or a noncontact thermal measurement device, a pet food receptacle configured to accept input from the thermal measurement device and provide indicia based thereupon, and written materials comprising instructions for use and interpretation of the indicia provided by the pet food receptacle. The written instructions may further indicate that the kit is advantageously used to indicate preference between two foods, and/or the kit may physically include two different foods for comparison.

As with the system and method, in some embodiments, the thermal measurement device of the kit may include a contact and/or a noncontact thermal measurement device. In some embodiments, the kit includes a noncontact thermal measurement device including a a thermal imaging device, a noncontact thermometer or a device incorporating both technologies. If a thermal imaging device is used, it may advantageously be a radiometric thermal imaging device.

As with the system and method, in some embodiments, the thermal measurement device of the kit may include a contact thermal measurement device including, but not limited to, a non-invasive surface contact thermometer.

The pet food receptacle may be any form of dish capable of containing food and being eaten from by a pet, such as a bowl of any shape, or an automatic dispenser. Whatever the format of the receptacle, it desirably is capable of receiving input from the noncontact thermal measurement device and providing indicia based thereupon. The indicia will desirably be readily perceived by the pet owner, and capable of interpretation using the instructions provided with the kit.

A non-transitory computer-readable medium is also provided. The medium stores instructions that, when executed by a processor, cause a computer system to identify which one of at least two pet foods are preferred by a companion animal. The medium does so by receiving at least a first and second input from a noncontact thermal measurement device operatively disposed relative to a pet food receptacle and comparing the first and second input. An output including the pet food preference of the companion animal is generated, and may further comprise a customized recommendation based on the output for an ongoing dietary regimen for the companion animal. The output and/or a custom recommendation including the output is then displayed on a graphical user interface.

DESCRIPTION OF THE DRAWINGS

The invention will now be particularly described by way of example, with reference to the accompanying diagrammatic drawings in which.

DETAILED DESCRIPTION

Figure 1:
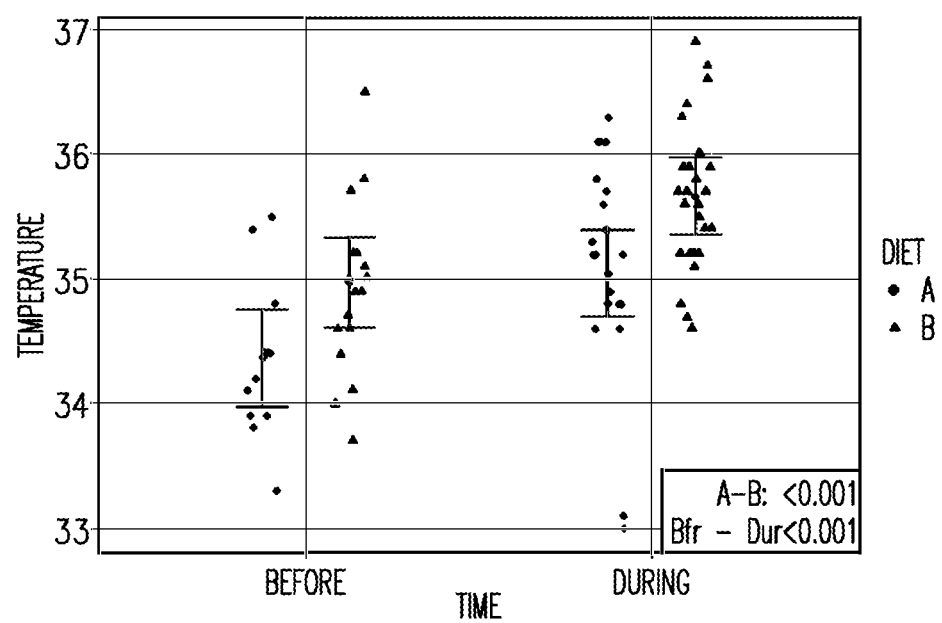
FIG. 1 is a graphical depiction of the maximal ocular surface temperature (° C.) obtained as described in Example 1.
Figure 2:
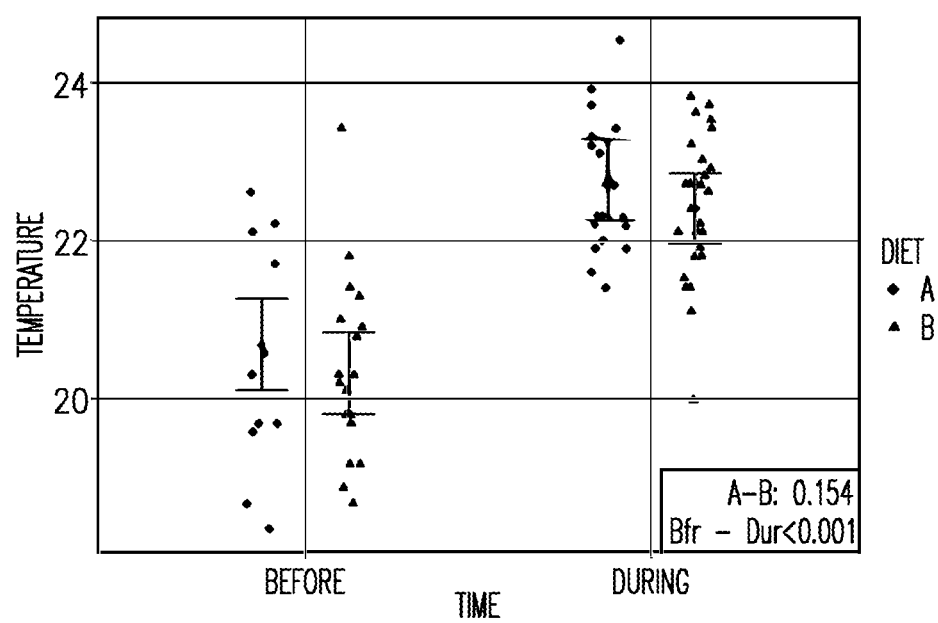
FIG. 2 is a graphical depiction of the minimal nose tip surface temperature (° C.) obtained as described in Example 1.

In some aspects, the present disclosure includes methods for evaluating a pet food, and particularly, for evaluating the preference of a companion animal for one food as compared to another, is provided. The method may be applied to any companion animal, including, e.g., dogs, cats, rabbits, gerbils, hamsters, and the like, and finds particular use in the evaluation of the preference of a dog or a cat to a particular food. The method may be particularly useful in evaluating the food preferences of a cat, at least because of their perceived finicky nature. That is, application of the method to the feeding behaviour of a cat may allow the cat's caretaker an objective indicia of the cat's preference of one food over another.

Any two pet foods may be compared using the present method, including dry, wet or semi-moist foods. A pet food is any food that an owner of a companion animal feeds to their companion animal. Suitably, pet foods may be labelled as pet foods on the packaging, and may be sold in supermarkets or specialist pet stores. Pet foods may include own-store brands such as Tesco, Sainsbury, or brands specific to pet foods such as Purina™, Whiskas™ and Pedigree™. Pet foods having less than 15% moisture are typically categorized as dry, foods having greater than about 50% moisture are typically categorized as wet, and those having moisture contents in between 15 and 50% are typically considered semi-moist or semi-dry. As many companion animals may prefer wet foods as opposed to dry, it may be, but is not necessary, that a dry food be compared to another dry food, a wet food be compared to another wet food, or a semi-moist food be compared to a semi-moist food.

Wet food is provided in two main formats—loaves or pates, and chunks in jelly, gravy or mousse. Similar to moisture content, it may be most illustrative, should two wet foods be the subject of comparison, to compare two wet foods having the same format so that the preference of the animal is to the formulation, and not the format. However, it is also possible to compare a loaf food to a chunks in gravy food, and the same is contemplated herein.

Although an animal's preference for non-edible and edible treats may be evaluated with the present method, the present method is particularly well suited to discern an animal's preference as between two foods. As used herein, a food is differentiated from a treat in that a food is contemplated to provide at least 75%, or at least 90%, or at least 95% or higher, of the animals daily caloric requirements. On the other hand, treats are typically contemplated to provide less than 25%, or less than 10% or less than 5%, of an animal's daily caloric requirements. The method is particularly well suited for use in determining an animal's preference between at least two nutritionally complete and balanced foods.

In some aspects, the method includes providing at least two foods to be compared to the companion animal. Desirably, the at least two foods are provided to the animal separately, e.g., at different mealtimes, so that the animal's reaction to each food may be independently measured. Provision at a time that is a typical mealtime for the animal will further ensure that the animal's response to the food is not impacted by a greater sense of hunger or urgency with respect to a food provided at the animal's normal mealtime, vs. a food that is provided within minutes or hours after an animal has eaten a meal.

An appropriate amount of a first desired food is provided to the animal. The food is provided in a receptacle capable of holding the food, and from which the animal is capable of feeding, such as a plate or bowl. The receptacle may be, but is not necessarily, one specifically designed for use by a companion animal, including slow feeders, weighted bowls, raised bowls, etc. The food may alternatively be provided by an automatic dispenser. The food is desirably not hand fed, as the animal's response to being handfed may be heightened, thereby obfuscating the animal's preference for the food with the animal's preference of method of provision of the food.

The receptacle may be a 'smart' receptacle, i.e., may be one configured for internet connection, or, be capable of receiving input from the noncontact thermal measurement device. In those instances wherein the receptacle is capable of receiving and storing input from the thermal measurement device, e.g., a noncontact and/or contact thermal measurement device, the receptacle may also be capable of displaying indicia in response to the input, as discussed further below.

The animal need not consume a full meal in order to collect the measurements described, nor is a certain number of measurements necessary. And so, any amount of food may be provided, so long as the animal interacts with the food for a sufficient amount of time to collect at least one measurement of the same parameter, e.g., temperature of the nose, or, from 2 to 4, or from 2 to 6, or from 4 to 8, up to 10, or more than 10 measurements of the same parameter. In order to provide the animal with familiar and comfortable circumstances, it may be desirable, though not required, to provide the animal with an amount of food calorically equivalent, or substantially calorically equivalent, to the amount of food the animal is normally provided at a mealtime.

Once the animal has had the first food interaction, i.e., the animal has interacted with the first food for comparison whether by smelling or by eating, and measurements taken before, during and/or after the interaction, the animal is provided with the second food for comparison for the second food interaction. Desirably, the first and second foods are provided separately, but under similar circumstances, i.e., at the same time of day but on different days, or on the same day, but at different mealtimes.

In some aspects, one or more thermal measurements are taken before, during and/or after the animal's interaction with the first pet food and again before, during and/or after the animal's interaction with the second pet food. Measurements may be taken before feeding, such as before the food is presented to the animal, but at a time of day the animal associates with feeding. Or, measurements may be taken during pre-feeding, during feeding, or post-feeding behaviors. The thermal measurement device may be a contact or a noncontact thermal measurement device.

Pre- and post-feeding behaviors can vary depending upon the species of companion animal, but can include approaching, sniffing, lip licking, and hygiene activities such as paw licking, etc. Generally speaking, pre- and post-feeding behaviors will typically occur within 30 minutes of eating, or within 20, 15, 10, 5, 4, 3, 2 or 1 minute(s) of eating, and pre- and post-feeding measurements may also be taken during these time frames. For example, pre- and post-feeding temperatures may desirably be taken within 30 seconds to 2 minutes of eating. For example, post-feeding temperatures may also be taken when the animal is still near the food but has clearly finished eating.

Taking measurements during this time frame can limit the effect of variables that may impact the animal's emotional state, as can taking the pre-feeding measurements for the two food products being compared under similar, or substantially identical, circumstances. As used herein, feeding or pre-feeding circumstances or variables includes room of testing, familiarity of the animal with the test administrator, arrangement and contents of room, room conditions, and any other visual or auditory stimuli perceivable by the animal.

In some embodiments, the thermal measurement is taken from a part of the companion animal not covered with fur/hair such as an eye, an ear, nose tip, a paw pad or a combination of these. This is at least because the insulating effect of hair or fur can interfere with or otherwise impact the measurement. Of course, there are breeds of many companion animals that are hairless, and in such cases, the thermal measurements may be taken at any convenient place on the animal. For those companion animals with coats of fur or hair, the noncontact thermal measurement may be taken from either or both eye(s), the inner surface of either or both ears, nose tip, or a combination of these.

One or more measurements taken when the animal is interacting with the first food are compared with the corresponding one or more measurements taken when the animal is interacting with the second food. Suitably, measurements taken during pre-feeding activity in connection with the first food are compared with measurements taken during the pre-feeding activity in connection with the second food, and measurements taken during feeding on the first food are compared with measurements taken while feeding on the second food. In another embodiment, measurements taken during feeding activity in connection with the first food are compared with measurements taken during the feeding activity in connection with the second food.

In some embodiments, a greater temperature may indicate a greater acceptance and/or enjoyment of the food being interacted with when the greater temperature was measured, while a lower temperature may indicate a lower enjoyment. In other embodiments, a lower temperature may indicate a greater acceptance and/or enjoyment of the food being interacted with when the lower temperature was measured, while a higher temperature may indicate a lower enjoyment. For example, it has been found that when a thermal measurement of the companion animal's nose is taken a lower temperature indicated a greater preference/enjoyment of the food being interacted with.

In some aspects, the thermal measurement device is a noncontact thermal measurement device. The noncontact thermal measurements may be taken with any noncontact device known to those of ordinary skill in the art, or any such noncontact thermal measuring devices later developed. Examples of suitable noncontact thermal measurement devices include, but may not be limited to, noncontact thermometers and thermal imaging cameras or video cameras, or portions of or combinations of these. For example, temperature measures can be taken from a still image captured from video footage. If a thermal imaging camera or video camera is to be used, it may desirably be a radiometric thermal imaging camera, such as an infrared radiometric camera. Manufacturers of suitable radiometric thermal imaging cameras include FLIR, Kimo, Land, Fluke, Sonel, Optris, DJI, Yuneec, etc.

In some aspects, the thermal measurement device is a contact thermal measurement device. The contact thermal measurements may be taken with any non-invasive, surface contact thermal measurement device known to those of ordinary skill in the art, or any such contact thermal measuring devices later developed. Examples of suitable contact thermal measurement devices include, but may not be limited to, surface contact thermometers.

The method is readily implemented by a pet owner, pet food manufacturer, or manufacturer of pet food components. Pet owners, for example, can use the method to select a food to provide to their pet (based upon the results of the method as to which of two foods the pet prefers), or to provide an indication of the pet's enjoyment of the food the pet is provided. Provision of a preferred food to a pet can lead to increased enjoyment of pet ownership on the part of the caretaker and thus, the enhancement of the bond between a pet and its caretaker.

In some aspects, the present disclosure includes a system useful for conducting the methods provided for herein. In some embodiments, the system includes a thermal measurement device, e.g., a noncontact or contact thermal measurement device, operatively disposed relative to a pet food receptacle, such as a food dish or an automatic dispenser. The thermal measurement device is considered "operatively disposed" to the receptacle when it is within a distance/angle that allows the device to nominally perform the measurement, and desirably, is at a distance/angle from the receptacle that allows the device to achieve its maximum resolution in the measurement. In some embodiments, the thermal measurement device is a noncontact thermal measurement device placed at a distance/angle so as to be unobtrusive to the companion animal.

This distance/angle will depend on the particular noncontact thermal measurement device selected. In some embodiments, a suitable distance between the noncontact thermal measurement device and measuring point may be 6 feet (1.8 m) or less, or 5 feet (1.5 m) or less, or 4 feet (1.2 m) or less, or 3 feet (0.9 m) or less, or 2 feet (0.6 m), or 1 foot (0.3 m), or even less. In some embodiments, the distance between the noncontact thermal measurement device and the measuring point is optimally between 3 and 4 feet, or between 0.9 and 1.2 meters. In some embodiments, the angle between the noncontact thermal measurement device and the measured surface may suitably be about 90 degrees. For example, the thermal measurement device is directed straight at the face of an animal so that the longitudinal axis of the thermal measurement device is perpendicular (i.e. 90 degrees) to the animal's face. Suitable body portions at this angle may include the nose tip or any other body portion that can be measured without obfuscation by fur. In another embodiment, the thermal measurement device is maintained on its vertical axis and the measured surface moves along the horizontal plane so that a different view of the measured surface is captured. The angle between the thermal measurement device and the measured surface may be 45 to 90 degrees inclusive. Such angles may be used when the measured surface is an animal's ear, giving a direct view of the skin of the ear of the animal not obfuscated by fur.

In another embodiment, the thermal measurement device can be tilted from the vertical axis in order to get a direct view of the skin of the animal so as not to be obfuscated by fur. Suitably, the thermal measurement device is maintained on a vertical axis and/or is at the height of the animal being measured.

Whatever the particular receptacle, it may be configured to accept input from the thermal measurement device, either via wired or wireless connection. In such instances, the receptacle may additionally be configured to provide indicia, such as by a graphical user interface, video, animation, alphanumeric or light display, based upon the input. For example, when the measurement indicates that the animal has preferred one food over another, the indicia may provide text (such as "Preferred" or "I like this!"), color (such as a color associated or correlated with preference, such as green or blue vs a color associated or correlated with warning, such as red, yellow or orange) or other (a number of paws correlated with preference), etc. Such indicia may provide further benefit/enjoyment to the pet owner, i.e., as they may feel reassured that their pet likes and enjoys the food provided to them.

The system may further comprise a processor and memory storing the code of an algorithm. When the code is executed by the processor, the system receives the inputs from the noncontact thermal measurement device, compares them, and generates an output for display on or near the system. The output may include indicia and/or a customized recommendation for the ongoing dietary regimen of the companion animal.

Because the method and system are readily implemented or used by a pet owner/consumer in order to determine the preference of their pet(s) as between at least two different foods, a kit is also provided. In some aspects, the kit includes a thermal measurement device, e.g., a noncontact or a contact thermal measurement device, a pet food receptacle configured to accept input from the thermal measurement device and provide indicia based thereupon, and written materials comprising instructions for use and interpretation of the indicia provided by the pet food receptacle. The written instructions may further indicate that the kit is advantageously used to indicate preference between two foods, and/or the kit may physically include two different foods for comparison.

As with the system and method, in some embodiments the noncontact thermal measurement device of the kit may include a thermal imaging device, a noncontact thermometer or a device incorporating both technologies. If a thermal imaging device is used, it may advantageously be a radiometric thermal imaging device.

As with the system and method, in some embodiments the thermal measurement device of the kit may include a contact thermal measurement device. In some versions, the contact thermal measurement device may include, but is not limited to surface contact thermometers.

The pet food receptacle may be any form of dish capable of containing food and being eaten from by a pet, such as a bowl of any shape, or an automatic dispenser. Whatever the format of the receptacle, it desirably is capable of receiving input from the thermal measurement device and providing indicia based thereupon. The indicia will desirably be readily perceived by the pet owner, and capable of interpretation using the instructions provided with the kit.

A non-transitory computer-readable medium is also provided. The medium stores instructions that, when executed by a processor, cause a computer system to identify which one of at least two pet foods are preferred by a companion animal. The medium does so by receiving at least a first and second input from a thermal measurement device operatively disposed relative to a pet food receptacle and comparing the first and second input. An output comprising the pet food preference of the companion animal is generated, and may further comprise a customized recommendation based on the output for an ongoing dietary regimen for the companion animal. The output and/or a custom recommendation including the output is then displayed on a graphical user interface.

Example 1

A cohort of cats (n=28) were distributed into six groups (of 4-5 cats each) by simple randomization, and each cat assigned to a sequence of two test conditions/feeding occasions according to a crossover design. The cats in each group were fed either an established high palatability diet (Diet B) or an established low palatability diet (Diet A) to start, depending on the randomization, and as shown below in Table 1. A single-bowl monadic testing protocol was followed, and the food was presented at approximately the same time each day. Testing was not conducted Friday through Sunday, and the cats were fed and housed per their normal routines.

TABLE 1

| Weekday | Week 1 | Diet | Week 2 | Diet | Week 3 | Diet |
|---|---|---|---|---|---|---|
| Monday | Group 1 | A | Group 3 | A | Group 5 | A |
| Tuesday | Group 1 | B | Group 3 | B | Group 5 | B |
| Wednesday | Group 2 | B | Group 4 | B | Group 6 | B |
| Thursday | Group 2 | A | Group 4 | A | Group 6 | A |

For each data collection, the same procedure was used, as follows. The cat was brought to a testing room containing the infrared camera (FLIR T540, commercially available from FLIR Systems, Wilsonville, OR) where it was presented with the food and baseline measurements taken. The food bowl was made accessible to the cat and the cat allowed to interact with and/or eat the food while thermal imaging was conducted. The cat was allowed to roam freely in the room during the time the food was accessible and measurements were being taken.

Thermal imaging was conducted in standardized conditions both immediately before (pre-feeding) and during the feeding occasion with each product. During the pre-feeding phase, cats were let to smell the product. Cats' eye temperatures were measured from still images obtained from the thermal video footage using FLIR Tools+ software.

Eye surface temperature was calculated from a region within the anterior surface region of the left eye. Statistical analyses were conducted to determine if significant differences in temperature existed between products.

The results of this Example are shown in Tables 2-4 below, and FIG. 1. Table 2 shows the Confidence interval and p-values for eye surface temperature (measured in ° C.) low (Diet A) and high (Diet B) palatability diets and for pre-feeding (Before) and feeding (During) phases.

TABLE 2

| Contrast | Difference | 95% Lower | 95% Upper | p-value |
|---|---|---|---|---|
| A-B | −0.612 | −0.935 | −0.288 | <0.001 |
| Before-During | −0.685 | −1.004 | −0.366 | <0.001 |

Table 3 shows the mean and upper and lower 95% confidence intervals for eye temperature for low (Diet A) and high (Diet B) palatability diets during pre-feeding (Before) and feeding (During) test phases.

TABLE 3

| Diet | Time | Mean (° C.) | 95% Lower | 95% Upper |
|---|---|---|---|---|
| A | Before | 34.362 | 33.964 | 34.760 |
| B | Before | 34.974 | 34.614 | 35.333 |
| A | During | 35.047 | 34.696 | 35.398 |
| B | During | 35.658 | 35.354 | 35.963 |

Example 2

A cohort of cats (n=28) were distributed into six groups (of 4-5 cats each) by simple randomization, and each cat assigned to a sequence of two test conditions/feeding occasions according to a crossover design. The cats in each group were fed either an established high palatability diet (Diet C) or an established low palatability diet (Diet D) to start, depending on the randomization, and as shown below in Table 4. A single-bowl monadic testing protocol was followed, and the food was presented at approximately the same time each day. Testing was not conducted Friday through Sunday, and the cats were fed and housed per their normal routines.

TABLE 4

| Weekday | Week 1 | Diet | Week 2 | Diet | Week 3 | Diet |
|---|---|---|---|---|---|---|
| Monday | Group 1 | D | Group 3 | D | Group 5 | D |
| Tuesday | Group 1 | C | Group 3 | C | Group 5 | C |
| Wednesday | Group 2 | C | Group 4 | C | Group 6 | C |
| Thursday | Group 2 | D | Group 4 | D | Group 6 | D |

For each data collection, the same procedure was used, as follows. The cat was brought to a testing room containing the infrared camera (FLIR T540, commercially available from FLIR Systems, Wilsonville, OR) where it was presented with the food and baseline measurements taken. The food bowl was made accessible to the cat and the cat allowed to interact with and/or eat the food while thermal imaging was conducted. The cat was allowed to roam freely in the room during the time the food was accessible and measurements were being taken.

Thermal imaging was conducted in standardized conditions both immediately before (pre-feeding) and during the feeding occasion with each product. During the pre-feeding phase, cats were let to smell the product. Cats' nose tip temperatures were measured from still images obtained from the thermal video footage using FLIR Tools+ software.

Nose tip temperature was calculated from a region within the anterior surface region of the tip of the nose. Statistical analyses were conducted to determine if significant differences in temperature existed between products.

The results of this Example are shown in Tables 5-6 below. Table 5 shows the Confidence interval and p-values for nose tip temperature (measured in ° C.) low (Diet D) and high (Diet C) palatability diets and for pre-feeding (Before) and feeding (During) phases.

TABLE 5

| Contrast | Difference | 95% Lower | 95% Upper | p-value |
|---|---|---|---|---|
| C-D | 0.642 | 0.126 | 1.157 | 0.008 |
| Before-During | −2.847 | −3.266 | −2.428 | <0.001 |

Table 6 shows the mean and upper and lower 95% confidence intervals for nose tip temperature for low (Diet D) and high (Diet C) palatability diets during pre-feeding (Before) and feeding (During) test phases.

TABLE 6

| Diet | Time | Mean (° C.) | 95% Lower | 95% Upper |
|---|---|---|---|---|
| C | Before | 17.461 | 16.899 | 18.022 |
| D | Before | 16.819 | 16.249 | 17.389 |
| C | During | 20.308 | 19.739 | 20.877 |
| D | During | 19.666 | 19.099 | 20.234 |

Example 3

A cohort of cats (n=40) were distributed into four groups (of 9-11 cats each) based on housing location, and each group assigned to a sequence of four test conditions/feeding occasions balanced for order. The cats were fed two repetitions of each of a high palatability diet (Diet E) and a low palatability diet (Diet F) as shown in Table 7. Palatability was established based on historical feeding data indicating that Diet E had a higher normalised intake than Diet F when offered in excess (116.99 g vs 81.80 g). A single-bowl monadic testing protocol was followed, and the food was presented at approximately the same time each day for each cat. Testing was conducted Monday through Thursday, and the cats were otherwise fed and housed per their normal routines.

TABLE 7

| Weekday | Week 1 | Diet | Week 2 | Diet | Week 3 | Diet | Week 4 | Diet |
|---|---|---|---|---|---|---|---|---|
| Monday | Group 1 | E | Group 2 | F | Group 3 | E | Group 4 | F |
| Tuesday | Group 1 | F | Group 2 | E | Group 3 | F | Group 4 | E |
| Wednesday | Group 1 | E | Group 2 | F | Group 3 | E | Group 4 | F |
| Thursday | Group 1 | F | Group 2 | E | Group 3 | F | Group 4 | E |

For each feeding occasion, the same procedure was used, as follows. The cat was brought to a testing room containing the infrared camera (FLIR T840, commercially available from FLIR Systems, Wilsonville, OR) where a baseline measurement was taken (Before). The food was then brought into the room and the cat was given the opportunity to smell the food, but not given access to interact, and a measurement reflecting their response to the food odour was taken (Smell). The food bowl was then made accessible to the cat and the cat allowed to interact with and/or eat the food while thermal imaging was conducted (During). A final thermal measurement was taken once the cat had stopped interacting with the food, but had yet to leave the feeding area (After). The cat was allowed to roam freely in the room throughout the feeding occasion.

Thermal imaging was conducted in standardized conditions throughout the feeding occasion with each product. The camera was placed approximately 1 m from the food bowl and on a level with the cats' head, and room temperature was maintained at 20° C. (±1° C.). Cats' eye, ear, and nose temperatures were measured from still images obtained from thermal video footage using FLIR Tools+ software.

Figure 3:
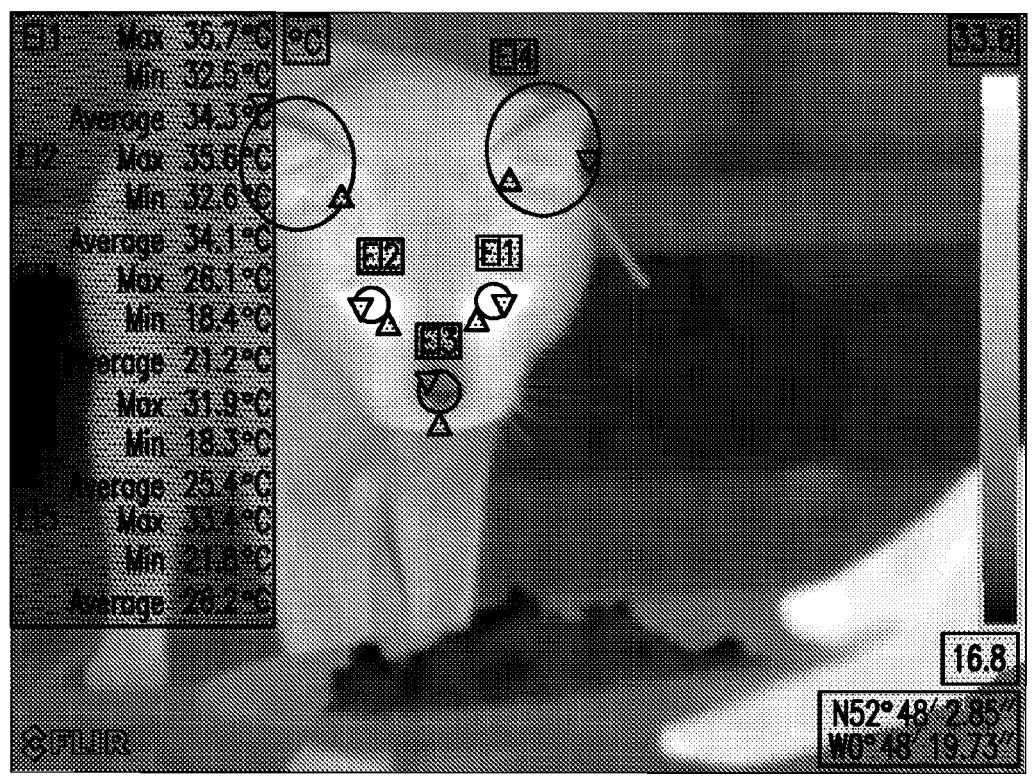
FIG. 3 is a thermal image still obtained from thermal video footage using FLIR Tools+ software.

For eye surface temperature, a still image was selected where the cat was directly facing the camera with the eyes open and visible (FIG. 3). A circular region was defined within both eyes and used to determine both the mean and maximum temperatures within the area.

For nose surface temperature, the same image as above was used with the cat directly facing the camera. A circular region was defined encompassing the nose and used to determine the minimum temperature within the area.

Figure 4:
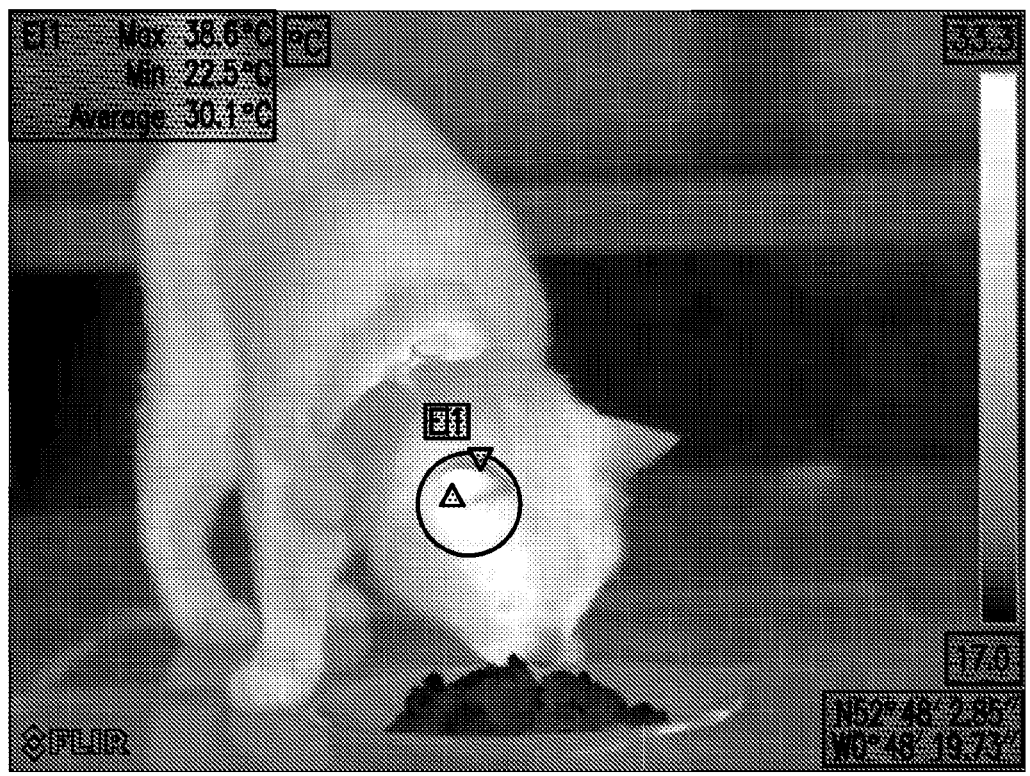
FIG. 4 is a thermal image still obtained from thermal video footage using FLIR Tools+ software wherein the camera has a direct view through the fur into the interior of the ear.

For ear surface temperature, three still images were collected, one with the cat facing the camera (same image as above for eye and nose temperature), and two separate images with the cat facing away from the camera at a 45 to 90° (inclusive) angle allowing for direct view through the fur into the interior of the ear (one each for the left and right sides), as shown in FIG. 4. For each of these images a circular region was defined encompassing the ear surface and extending to the upper region on the cat's temple. From within this region the maximum surface temperature was determined.

In order to determine whether the left and right sides of the cat were interoperable, the variance components for cat, diet, and side were compared for the ear and both eye measures. Additionally, to determine the effect of the camera angle for ear measurements, the direct and angled stills for the left ear were compared. Finally, statistical analyses were conducted for all measured regions to determine if significant differences in temperature existed between diets, time points, and repetitions.

The results of this Example are shown in Tables 8-13 below. Camera angle had a significant effect on ear temperature, with angled views displaying the most consistent results between diet and repetitions. Therefore, all results presented relating to ear are based on the angled view. Table 8 shows the variance and standard deviations for the cat, diet, and side values for ear and eye surface temperature measures. Results indicate that for eye values the variance for side is considerably lower than that of cat and diet, indicating, left and right sides are interoperable for eye temperature measures. However, ear values had higher variance for side compared to cat and diet, and therefore, side should be considered and controlled for when measuring ear temperature. For the following results for effect of side is accounted for with the inclusion of a random effect.

TABLE 8

| Group | Ear Variance | Ear SD | Eye (mean) Variance | Eye (mean) SD | Eye (max) Variance | Eye (max) SD |
|---|---|---|---|---|---|---|
| Cat | 0.382 | 0.618 | 0.167 | 0.408 | 0.187 | 0.433 |
| Diet | 0.001 | 0.038 | 0.013 | 0.114 | 0.011 | 0.105 |
| Side | 0.514 | 0.717 | 0.002 | 0.041 | 0.005 | 0.072 |

Table 9 shows the differences and p-values for the contrasts in maximum ear temperature (measured in ° C.) between high (Diet E) and low (Diet F) palatability diets, the two repetitions (Rep 1, Rep 2), and the four different time points (Before, Smell, During, After). Results indicate that there were higher temperatures recorded for the Diet E compared to Diet F (E-F gives a difference of 0.169 in Table 9). Temperature increased on the second repetition, but this difference was consistent between diets. Temperature also increased between the pre-feeding time points (Before & Smell) to the post-feeding time points (During & After), and this difference was consistent between diets.

TABLE 9

| Contrast | Difference | p-value |
|---|---|---|
| E-F | 0.169 | <0.001 |
| Rep 1-Rep 2 | −0.118 | 0.021 |
| Before-Smell | −0.175 | 0.100 |
| Before-During | −0.905 | <0.001 |
| Before-After | −0.799 | <0.001 |
| Smell-During | −0.730 | <0.001 |
| Smell-After | −0.625 | <0.001 |
| During-After | 0.105 | 0.415 |

Table 10 shows the differences and p-values for the contrasts in maximum eye temperature (measured in ° C.) between high (Diet E) and low (Diet F) palatability diets (Table 10 shows E-F as 0.146), the two repetitions (Rep 1, Rep 2), and the four different time points (Before, Smell, During, After). As with ear temperature, results indicate that there were higher temperatures recorded for Diet E compared to Diet F. Temperature increased on the second repetition, but this difference was consistent between diets. Temperature decreased from the Before to Smell time point, but then increased between Smell and During, and again between During and After. This difference between time points was consistent between diets.

TABLE 10

| Contrast | Difference | p-value |
|---|---|---|
| E-F | 0.146 | <0.001 |
| Rep 1-Rep 2 | −0.138 | <0.001 |
| Before-Smell | 0.146 | 0.002 |

TABLE 10-continued

| Contrast | Difference | p-value |
|---|---|---|
| Before-During | −0.074 | 0.258 |
| Before-After | −0.192 | <0.001 |
| Smell-During | −0.220 | <0.001 |
| Smell-After | −0.338 | <0.001 |
| During-After | −0.118 | 0.017 |

Figure 5:
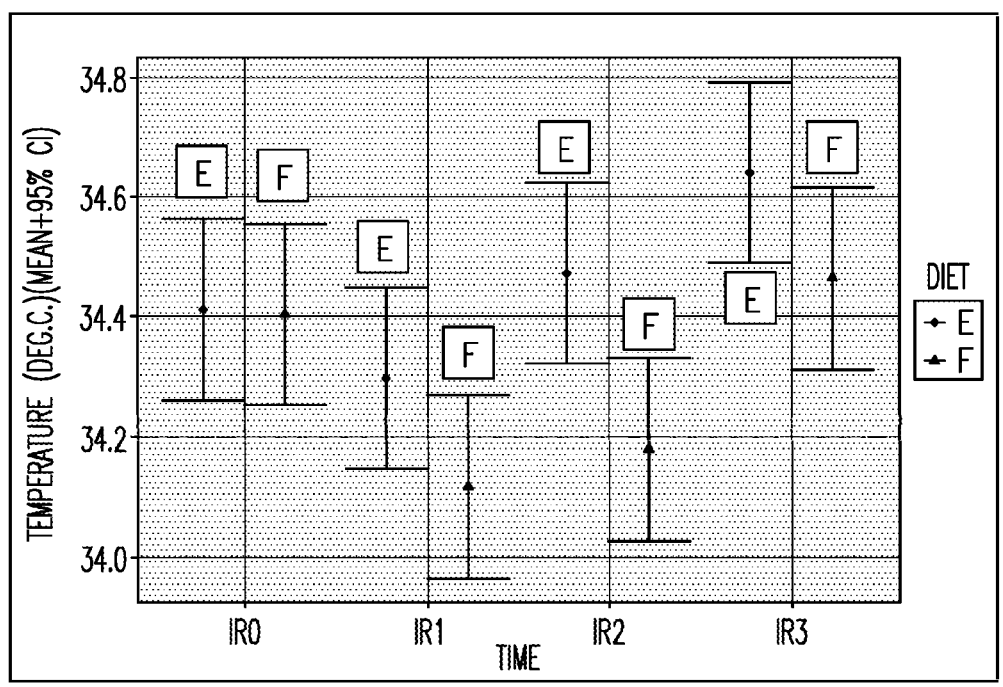
FIG. 5 is a graphical depiction of the results in table 11, showing the difference in mean eye temperature (measured in ° C.) between high (Diet E) and low (Diet F) palatability diets for each of the four different time points (IR0=Before, IR1=Smell, IR2=During, IR3=After). At each time point, the left hand bar is the data for diet E and the right hand bar is the data for diet F.

Table 11 shows the differences and p-values for the contrasts in mean eye temperature (measured in ° C.) between high (Diet E) and low (Diet F) palatability diets for each of the four different time points (Before, Smell, During, After), and between the two repetitions (Rep 1, Rep 2). Results indicate that there was a significant interaction between diet and time point, as shown in FIG. 5. Higher temperatures were recorded for Diet E compared to Diet F, but only in the time points after the food was presented to the cat (Smell, During, After) with no significant difference between diets in the Before time point. Temperature increased on the second repetition, but this difference was consistent between diets.

TABLE 11

| Contrast | Difference | p-value |
|---|---|---|
| Before: Diet E-F | 0.007 | 0.905 |
| Smell: Diet E-F | 0.180 | 0.004 |
| During: Diet E-F | 0.292 | <0.001 |
| After: Diet E-F | 0.176 | 0.004 |
| Rep 1-Rep 2 | −0.095 | 0.002 |

Table 12 shows the differences and p-values for the contrasts in minimum nose temperature (measured in ° C.) between high (Diet E) and low (Diet F) palatability diets, the two repetitions (Rep 1 and Rep 2), and the four different time points (Before, Smell, During, After). Results indicate that there were lower nose temperatures recorded for Diet E compared to Diet F. Temperature increased on the second repetition, but this difference was consistent between diets. Temperature also increased between the pre-feeding time points (Before & Smell) to the post-feeding time points (During & After), and this difference was consistent between diets.

TABLE 12

| Contrast | Difference | p-value |
|---|---|---|
| E-F | −0.201 | 0.011 |
| Rep 1-Rep 2 | −0.382 | <0.001 |
| Before-Smell | 0.095 | 0.830 |
| Before-During | −1.044 | <0.001 |
| Before-After | −1.329 | <0.001 |
| Smell-During | −1.139 | <0.001 |
| Smell-After | −1.424 | <0.001 |
| During-After | −0.285 | 0.051 |

Table 13 shows the mean and 95% confidence interval for temperature at the four different regions (Ear Max, Eye Max, Eye Mean, Nose Min) based on the variables for the different diets (Diet E, Diet F), the different repetitions (Rep 1, Rep 2), and the different time points (Before, Smell, During, After). As there was an interaction between diet and time point for Eye Mean, a separate mean and confidence interval are presented for each diet and time point combination.

TABLE 13

| Region | Variable | Mean (° C.) | 95% Lower | 95% Upper |
|---|---|---|---|---|
| EarMax | Diet E | 37.04 | 36.88 | 37.20 |
| | Diet F | 36.87 | 36.71 | 37.03 |
| | Rep 1 | 36.89 | 36.74 | 37.06 |
| | Rep 2 | 37.02 | 36.86 | 37.17 |
| | Before | 36.49 | 36.31 | 36.66 |
| | Smell | 36.66 | 36.48 | 36.84 |
| | During | 37.39 | 37.22 | 37.56 |
| | After | 37.29 | 37.12 | 37.46 |
| EyeMax | Diet E | 35.60 | 35.45 | 35.74 |
| | Diet F | 35.44 | 35.30 | 35.59 |
| | Rep 1 | 35.45 | 35.31 | 35.60 |
| | Rep 2 | 35.59 | 35.45 | 35.74 |
| | Before | 35.49 | 35.34 | 35.64 |
| | Smell | 35.35 | 35.20 | 35.50 |
| | During | 35.57 | 35.42 | 35.72 |
| | After | 35.68 | 35.53 | 35.83 |
| EyeMean | Before: Diet E | 34.41 | 34.26 | 34.56 |
| | Before: Diet F | 34.40 | 34.25 | 34.56 |
| | Smell: Diet E | 34.30 | 34.14 | 34.45 |
| | Smell: Diet F | 34.12 | 33.96 | 34.27 |
| | During: Diet E | 34.47 | 34.32 | 34.62 |
| | During: Diet F | 34.18 | 34.03 | 34.33 |
| | After: Diet E | 34.64 | 34.49 | 34.79 |
| | After: Diet F | 34.46 | 34.31 | 34.61 |
| | Rep 1 | 34.32 | 34.19 | 34.46 |
| | Rep 2 | 34.42 | 34.29 | 34.55 |
| NoseMin | Diet E | 20.22 | 20.04 | 20.40 |
| | Diet F | 20.42 | 20.24 | 20.60 |
| | Rep 1 | 20.13 | 19.95 | 20.31 |
| | Rep 2 | 20.51 | 20.33 | 20.69 |
| | Before | 19.75 | 19.54 | 19.96 |
| | Smell | 19.65 | 19.44 | 19.87 |
| | During | 20.79 | 20.58 | 21.01 |
| | After | 21.08 | 20.87 | 21.29 |

What is claimed is:

1. A method for evaluating a companion animal's preference for a companion pet food, comprising:
based on a particular body portion of a companion animal from which noncontact thermal measurements are to be taken for use in evaluating the companion animal's preference for either a first pet food or a second pet food, positioning a noncontact thermal measurement device at a particular location and a particular angle relative to a receptacle configured to hold the first pet food and the second pet food to cause the noncontact thermal measurement device to take the noncontact thermal measurements from the particular body portion;
providing the first pet food and the second pet food to the companion animal via the receptacle;
taking, via the noncontact thermal measurement device, a plurality of first noncontact thermal measurements from the particular body portion of the companion animal in a first food interaction with the first pet food as the receptacle is holding the first pet food, the plurality of first noncontact thermal measurements including one or more first pre-feeding measurements, one or more first feeding measurements, and one or more first post-feeding measurements, wherein the first food interaction is occurring at a first time in association with a plurality of first environmental variables;
taking, via the noncontact thermal measurement device, a plurality of second noncontact thermal measurements from the particular body portion of the companion animal in a second food interaction with the second pet food as the receptacle is holding the second pet food, the plurality of second noncontact thermal measurements including one or more second pre-feeding measurements, one or more second feeding measurements, and one or more second post-feeding measurements, wherein the second food interaction is occurring at a second time in association with a plurality of second environmental variables, wherein the plurality of first environmental variables and the plurality of second environmental variables include one or more of: a room in which the first food interaction or the second food interaction is occurring, a familiarity of the companion animal with an administrator of the first food interaction or the second food interaction, an arrangement and contents of the room, or conditions of the room associated with visual or auditory stimuli perceivable by the companion animal, and wherein at least one second environmental variable of the plurality of second environmental variables is different from the plurality of first environmental variables and is capable of impacting a state of the companion animal that affects noncontact thermal measurement values;
comparing, by one or more processors, the one or more first feeding measurements and the one or more second feeding measurements to determine a difference, wherein, to minimize effects of the at least one second environmental variable, the one or more first pre-feeding and post-feeding measurements and the one or more second pre-feeding and post-feeding measurements are further analyzed to determine the difference, and wherein the difference indicates a difference in preference for either the first pet food or the second pet food; and
based on the comparing, generating and providing, by the one or more processors to a display device associated with the receptacle, indicia of the preference for either the first pet food or the second pet food for display on the display device.

2. The method of claim 1, wherein the companion animal is a dog or cat.

3. The method of claim 1, wherein the plurality of first noncontact thermal measurements or the plurality of second noncontact thermal measurements measure a temperature of the particular body portion of the companion animal, and the particular body portion of the companion animal is not covered with fur/hair.

4. The method of claim 3, wherein the plurality of first noncontact thermal measurements measure a temperature of either or both eye(s), either or both ear(s), nose tip, or a combination of these.

5. The method of claim 4, wherein the plurality of second noncontact thermal measurements measure a temperature of either or both eye(s), and/or the nose tip or a combination of these.

6. The method of claim 4, wherein the plurality of first noncontact thermal measurements measure the temperature of either or both eye(s), either or both ear(s) or a combination of these, and wherein a higher temperature measurement indicates a greater acceptance and/or enjoyment of the first pet food that the companion animal was interacting with during the taking of the plurality of first noncontact thermal measurements compared to a lower temperature measurement associated with another pet food.

7. The method of claim 3, wherein the plurality of first noncontact thermal measurements measure a temperature of a nose tip of the companion animal, and wherein a lower temperature indicates a greater acceptance and/or enjoyment of the first pet food the companion animal was interacting with during the taking of the plurality of first noncontact thermal measurements compared to a higher temperature measurement associated with another pet food.

8. The method of claim 1, wherein the noncontact thermal measurement device is a thermal imaging device, a noncontact thermometer, or a combination of these.

9. The method of claim 8, wherein the noncontact thermal measurement device is a thermal imaging device comprising a radiometric thermal imaging device.

10. The method of claim 8, wherein an angle between the noncontact thermal measurement device and a surface for measurement associated with the particular body portion of the companion animal is between 45 and 90 degrees.

11. The method of claim 1, wherein a pre-feeding behavior of the companion animal associated with one or more of the first food interaction or the second food interaction comprises smelling behavior.

12. The method of claim 8, wherein providing the first pet food and the second pet food comprises placing an amount of the first pet food and the second pet food in the receptacle.

13. The method of claim 12, wherein the receptacle comprises a dish or an automatic dispenser.

14. The method of claim 1, wherein the indicia of the preference for either the first pet food or the second pet food generated and provided for display on the display device is one of a text, a video, an animation, or a color indicating the preference.

15. The method of claim 1, wherein the first time and the second time are one of:
  a same time on different days; or
  a different mealtime on a same day.

16. A system comprising:
  a noncontact thermal measurement device;
  a pet food receptacle configured to hold pet food, wherein, based on a particular body portion of a companion animal from which noncontact thermal measurements are to be taken for use in evaluating a preference of the companion animal associated with the pet food, the noncontact thermal measurement device is positioned at a particular location and a particular angle relative to the pet food receptacle to cause the noncontact thermal measurement device to take one or more noncontact thermal measurements from the particular body portion of the companion animal as the companion animal interacts with the pet food;
  a display device;
  at least one memory storing instructions; and
  at least one processor configured to execute the instructions to cause the system to:
    receive, from the noncontact thermal measurement device, a plurality of first noncontact thermal measurements captured by the noncontact thermal measurement device as the companion animal is having a first food interaction with a first pet food held by the pet food receptacle, the plurality of first noncontact thermal measurements including one or more first pre-feeding measurements, one or more first feeding measurements, and one or more first post-feeding measurements, wherein the first food interaction is occurring at a first time in association with a plurality of first environmental variables;
    receive, from the noncontact thermal measurement device, a plurality of second noncontact thermal measurements captured by the noncontact thermal measurement device as the companion animal is having a second food interaction with a second pet food, different from the first pet food, held by the pet food receptacle, the plurality of second noncontact thermal measurements including one or more second pre-feeding measurements, one or more second feeding measurements, and one or more second post-feeding measurements, wherein the second food interaction is occurring at a second time in association with a plurality of second environmental variables, wherein the plurality of first environmental variables and the plurality of second environmental variables include one or more of: a room in which the first food interaction or the second food interaction is occurring, a familiarity of the companion animal with an administrator of the first food interaction or the second food interaction, an arrangement and contents of the room, or conditions of the room associated with visual or auditory stimuli perceivable by the companion animal, and wherein at least one second environmental variable of the plurality of second environmental variables is different from the plurality of first environmental variables and is capable of impacting a state of the companion animal that affects noncontact thermal measurement values;
    compare the one or more first feeding measurements and the one or more second feeding measurements to determine a difference, wherein, to minimize effects of the at least one second environmental variable, the one or more first pre-feeding and post-feeding measurements and the one or more second pre-feeding and post-feeding measurements are further analyzed to determine the difference;
    determine a preference for one of the first pet food or the second pet food based on the difference, and
    generate and provide, to the display device, indicia of the preference for the one of the first pet food or the second pet food for display on the display device.

17. The system of claim 16, wherein the noncontact thermal measurement device comprises a thermal imaging device, a noncontact thermometer, or a combination of these.

18. The system of claim 17, wherein the noncontact thermal measurement device comprises a radiometric thermal imaging device.

19. The system of claim 16, wherein the pet food receptacle comprises a dish or an automatic dispenser.

20. The system of claim 16, wherein the at least one processor further causes the system to generate a customized recommendation for an ongoing dietary regimen of the companion animal.

21. The system of claim 16, wherein the display device is a display of the pet food receptacle.

22. A non-transitory computer-readable medium storing instructions that, when executed by a processor, cause a computer system to identify which one of at least two pet foods is preferred by a companion animal by:
  receiving a first input and a second input from a noncontact thermal measurement device operatively disposed relative to a pet food receptacle as the pet food receptacle is holding a first pet food and a second pet food of the at least two pet foods, respectively, wherein:
    based on a particular body portion of a companion animal from which noncontact thermal measurements are to be taken for use in evaluating the companion animal's preference for either the first pet food or the second pet food, the noncontact thermal measurement device is operatively disposed at a particular location and a particular angle relative to the pet food receptacle to cause the noncontact thermal measurement device to take a plurality of first noncontact thermal measurements comprising the first input from the particular body portion of the companion animal as the companion animal is having a first food interaction with the first pet food held by the pet food receptacle, and take a plurality of second noncontact thermal measurements comprising the second input from the particular body portion of the companion animal as the companion animal is having a second food interaction with the second pet food held by the pet food receptacle, the plurality of first noncontact thermal measurements comprising the first input include one or more first pre-feeding measurements, one or more first feeding measurements, and one or more first post-feeding measurements, wherein the first food interaction is occurring at a first time in association with a plurality of first environmental variables, and the plurality of second noncontact thermal measurements comprising the second input include one or more second pre-feeding measurements, one or more second feeding measurements, and one or more second post-feeding measurements, wherein the second food interaction is occurring at a second time in association with a plurality of second environmental variables, wherein the plurality of first environmental variables and the plurality of second environmental variables include one or more of: a room in which the first food interaction or the second food interaction is occurring, a familiarity of the companion animal with an administrator of the first food interaction or the second food interaction, an arrangement and contents of the room, or conditions of the room associated with visual or auditory stimuli perceivable by the companion animal, and wherein at least one second environmental variable of the plurality of second environmental variables is different from the plurality of first environmental variables and is capable of impacting a state of the companion animal that affects noncontact thermal measurement values;

comparing the one or more first feeding measurements from the first input and the one or more second feeding measurements from the second input to determine a difference, wherein, to minimize effects of the at least one second environmental variable, the one or more first pre-feeding and post-feeding measurements and the one or more second pre-feeding and post-feeding measurements are further analyzed to determine the difference;

generating, as an output based on the difference, a pet food preference of the companion animal;

generating a customized recommendation based on the output for an ongoing dietary regimen for the companion animal; and generating and providing, to a display device associated with the computer system, indicia of the pet food preference and a customized recommendation for display on the display device.

* * * * *